March 21, 1950 C. B. STADUM 2,501,358
RESISTANCE WELDING ELECTRONIC CONTROL CIRCUIT
Filed June 25, 1945 2 Sheets-Sheet 1

WITNESSES:
Edward Michaels
John R. Shipman

INVENTOR
Clarence B. Stadum.
BY
F. W. Lyle
ATTORNEY

March 21, 1950  C. B. STADUM  2,501,358
RESISTANCE WELDING ELECTRONIC CONTROL CIRCUIT
Filed June 25, 1945  2 Sheets-Sheet 2

WITNESSES:
Edward Michaels
John R. Shipman

INVENTOR
Clarence B. Stadum.
BY
F. W. Lyle
ATTORNEY

Patented Mar. 21, 1950

2,501,358

UNITED STATES PATENT OFFICE 2,501,358

RESISTANCE WELDING ELECTRONIC CONTROL CIRCUIT

Clarence B. Stadum, Edgewood, Pa., assignor to Westinghouse Electric Corporation, East Pittsburgh, Pa., a corporation of Pennsylvania Application June 25, 1945, Serial No. 601,426

1 Claim. (Cl. 250—27)

This invention relates to an electronic control system and has particular relation to a control system for use with resistance welding apparatus.

In electronic controls for resistance welding, as constructed in accordance with the teachings of the prior art, current is supplied from an alternating-voltage supply source to the welding transformer through a pair of inversely connected electric valves. These valves are usually discharge valves of the arc-like type, such as ignitrons or thyratrons, and are rendered conductive alternately in half periods of the supply voltage of opposite polarity throughout the welding period.

In some applications, the welding period is initiated at random and extends for a time period which is controlled either manually or automatically. With such an arrangement and with the current lagging in phase behind the supply voltage as a result of the inductance of the welding load, large transient currents are often obtained because of the random initiation of the current flow. These transient currents may be sufficiently large to cause a defective weld. Moreover, such an arrangement does not provide any control of the heat at the weld, for the valves conduct the maximum current available to the welding transformer. In addition, the welding period, unless accurately controlled, may extend over an odd number of half periods of the source voltage tending to cause saturation of the welding transformer with correspondingly undesirable welding operations.

Saturation of the welding transformer has sometimes been avoided in the past by providing what is known as a follow-up circuit in the control system. In systems using such prior followup circuits, the welding period is initiated at will whereupon the first of the inversely connected valves is rendered conductive in a half-period of the supply voltage of one polarity. This first valve continues to be rendered conductive in each half-period of the same polarity throughout the welding period. The second or follow-up valve is rendered conductive in each half-period of opposite polarity but only as a result of conduction of the first valve in the immediately preceding half-period. Moreover, the second valve is always rendered conductive in the half-period following a conductive half-period of the first valve regardless of the action of the automatic or manual timing control.

To accomplish such follow-up operation, an auxiliary transformer has its primary winding connected across the primary winding, or a portion thereof, of the welding transformer and its secondary winding connected in the control circuit of the second valve. With the current through the primary winding of the welding transformer lagging behind the voltage while the first valve is conductive, as it does in welding systems of the character described, the secondary winding of the auxiliary transformer impresses a voltage in the control circuit of the second valve sufficient to render that valve conductive at the beginning of the next half-period.

A rather complicated and expensive control apparatus has been employed in the past, to avoid large transient currents and provide control of the heat at the weld. The transient currents are avoided by preventing the initiation of the welding current flow until an instant in a half-period of the supply voltage at least as late as the instant of zero current. The heat at the weld is controlled by causing the valves to be rendered conductive at instants in the corresponding half-periods which are predeterminable at will. The instant in a half-period at which a valve is rendered conductive determines the R. M. S. current flowing through the welding transformer and, consequently, determines the heat developed at the weld. It is to be noted, however, that the usual follow-up circuit cannot be employed with apparatus providing heat control of this nature because the second or follow-up valve always conducts the maximum current available. In such cases, saturation of the transformer is avoided by other means such as the use of a complicated timing system.

It is an object of my invention to provide a new and improved electronic apparatus for controlling the energization of a load circuit.

Another object of my invention is to provide a new and simplified control system for use in resistance welding.

A further object of my invention is to provide a new and improved apparatus for controlling energization of a load from an alternating-current source in which large transients are avoided.

A further object of my invention is to provide a new and improved apparatus for controlling energization of a load transformer from an alternating-current source in which saturation of the transformer is avoided.

Still another object of my invention is to provide a new and improved apparatus for controlling energization of a load from an alternating-current source in which the R. M. S. load current is predeterminable at will.

More specifically, it is an object of my invention to provide a new and simplified apparatus for controlling the energization of a welding transformer from an alternating-current source in which large transients and saturation of the transformer are avoided, and the R. M. S. current supplied to the transformer is predeterminable at will.

In accordance with my invention, I provide a control system in which the first of a pair of inversely connected valves is rendered conductive in half-periods of the source voltage of one polarity at an instant predeterminable at will. A control circuit for the second valve is arranged to maintain the valve normally nonconductive, but to render it conductive at an instant predeterminable at will in a half-period of the source voltage of opposite polarity provided the first valve was conductive in the preceding half-period. In the preferred embodiments illustrated, this is accomplished by a novel follow-up circuit.

The features of my invention, which I consider novel, are set forth with more particularity in the appended claim. The invention itself, however, with respect to the details thereof, together with additional objects and advantages, may be better understood from the following description of an embodiment of my invention and a modification thereof with reference to the accompanying drawings, in which Figure 1 is a schematic diagram illustrating the preferred embodiment of my invention;

Figure 1:
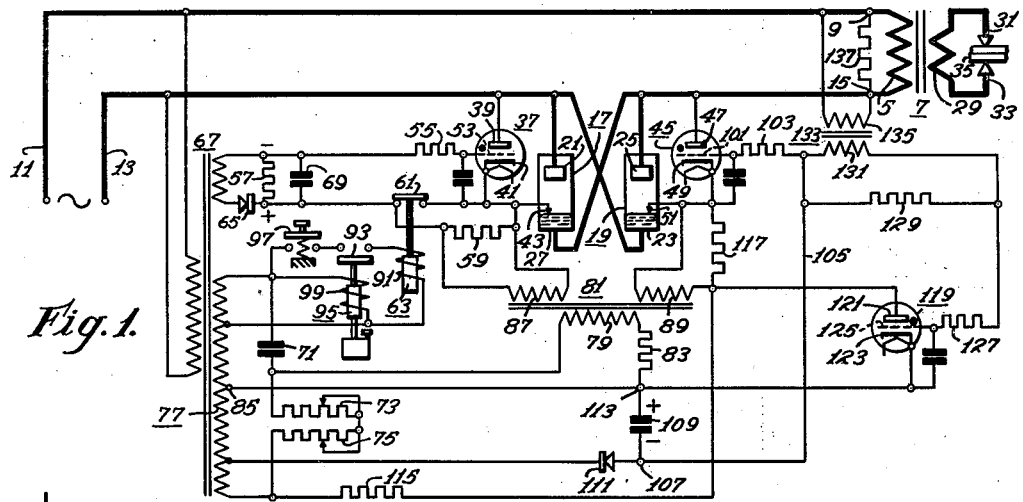

As shown in Figure 1 of the drawings, the primary winding 5 of a welding transformer 7 has one terminal 9 connected directly to one of a pair of alternating-voltage supply lines 11 and 13. The other terminal 15 of primary winding 5 is connected to the other supply line 13 through a pair of inversely connected electric discharge valves 17 and 19 of the arc-like type, preferably ignitrons. Because of the inverse connection, the anode 21 of the first ignitron 17 is connected to the cathode 23 of the second ignitron 19, and the anode 25 of the second ignitron 19 is connected to the cathode 27 of the first ignitron 17. Consequently, the first ignitron 17 may conduct current only in a direction from the second supply line 13 through the primary winding 5 to the first supply line 11, while the second ignitron 19 may conduct current only in the opposite direction. The secondary winding 29 of the welding transformer 7 is connected in circuit with a pair of welding electrodes 31 and 33 and the material 35 to be welded which is engaged therebetween.

An electric discharge valve 37 of the arc-like type, such as a thyratron, hereinafter designated as the first firing valve, has its anode 39 and cathode 41 connected between the anode 21 and ignition electrode 43 of the first ignitron 17. Another electric discharge valve 45 of the arc-like type, such as a thyratron, hereinafter designated as the second firing valve, has its anode 47 and cathode 49 connected between the anode 25 and ignition electrode 51 of the second ignitron 19. As is well known, when either of these firing valves 37 and 45 is rendered conductive, current flows through the ignition electrode of the corresponding ignitron to render that ignitron conductive. When an ignitron becomes conductive, it effectively short-circuits the corresponding firing valve, causing it to become nonconductive.

A control circuit is provided for the first firing valve 37 which extends from the grid 53 thereof through a grid resistor 55, a biasing resistor 57 and a third resistor 59 to the cathode 41. The third resistor 59 is short-circuited through a normally closed contact 61 of a relay 63, and so has no effect upon the firing valve 37. The biasing resistor 57 has a biasing voltage developed thereacross by current supplied through a rectifier 65 and an auxiliary transformer 67 energized from the supply lines 11 and 13. A filter capacitor 69 is connected in parallel with the biasing resistor 57. The voltage appearing across the biasing resistor 57 is of such polarity and magnitude as to maintain the grid 53 of the first firing valve 37 sufficiently negative with respect to the cathode 41 to prevent the valve from becoming conductive.

A phase-shifting circuit is provided comprising a capacitor 71, a potentiometer 73 and a variable resistor 75 connected in series in the order named across the terminals of a secondary winding 77 of the auxiliary transformer 67. The primary winding 79 of an impulse transformer 81 is connected in series with a resistor 83 from the junction point between the capacitor 71 and the potentiometer 73 and an intermediate tap 85 on the secondary winding 77. A pair of secondary windings 87 and 89 is provided for the impulse transformer 81, and one of these windings 87 is connected across the third resistor 59 in the control circuit of the first firing valve 37. As a result of the phase-shifting arrangement, a voltage impulse is impressed across the third resistor 59 at a predetermined instant in each half-period of the supply voltage. The polarity and magnitude of this voltage impulse is such that when contacts 61 are open it overcomes the biasing voltage across the biasing resistor 57 and renders the first firing valve 37 conductive in each half-period of the supply voltage in which the anode 39 is positive with respect to the cathode 41. The instant in a half-period at which the voltage impulse occurs is determined by the adjustment of the variable resistor 75 and the potentiometer 73 in the phase-shifting circuit.

The energizing coil 91 of the relay 63 is connected across a portion of the secondary winding 77 of the auxiliary transformer 67 through the originally open contacts 93 of a time delay relay 95 and the originally open push-button switch 97. The energizing coil 99 of the time delay relay 95 is connected directly across a portion of the secondary winding 77, but is arranged to effect closure of the contacts 93 only after a predetermined time delay, of the order of five minutes, to insure adequate heating of the cathodes of the firing valves before operation of the circuit is initiated by operation of the push-button switch.

The control circuit of the second firing valve 45 may be traced from the grid 101 thereof through a grid resistor 103 and a conductor 105 to the negative terminal 107 of a biasing capacitor 109 which is charged from the secondary winding 77 of the auxiliary transformer 67 through a rectifier 111. The control circuit continues from the positive terminal 113 of the capacitor 109 to the center tap 85 of the secondary winding 77, and from the lower end of the secondary winding through a second resistor 115 and a third resistor 117 to the cathode 49.

The voltage across the biasing capacitor 109 tends to maintain the second firing valve 45 nonconductive. However, the second secondary winding 89 of the impulse transformer 81 is connected across the third resistor 117 in the control circuit of the second firing valve 45. As a result, a voltage impulse is impressed across the third resistor 117 at predetermined instants in each half-period which is sufficient to overcome the biasing voltage of the capacitor 109 and tends to render the second firing valve 45 conductive at the predetermined instant in a half-period in which the anode 47 is positive with respect to the cathode 49. But an alternating voltage is also impressed in the control circuit of the second firing valve 45 through the secondary winding 77 of the auxiliary transformer 67. The phase of this alternating voltage in the control circuit is such that the voltage tends to make the grid 101 highly negative during the half-periods of the supply voltage in which the anode 47 is positive with respect to the cathode 49. The alternating voltage thus impressed in the control circuit is sufficient to prevent the voltage impulse across the third resistor 117 from rendering the second firing valve conductive.

An auxiliary electric discharge valve 119 of the arc-like type, such as a thyratron, has its anode 121 and cathode 123 connected across the portion of the secondary winding 77 of the auxiliary transformer 67 which is included in the control circuit of the second firing valve 45. The connection is such that the auxiliary valve 119, when conductive, effectively prevents the alternating voltage of secondary winding 77 from being impressed in the control circuit of the second firing valve 45 during a half-period in which the second firing valve might become conductive.

The control circuit of the auxiliary valve 119 extends from the grid 125 thereof, through a grid resistor 127, a second resistor 129 and the biasing capacitor 109 to the cathode 123. The voltage across the biasing capacitor 109 is also effective to bias the auxiliary valve 119 tending to maintain it nonconductive.

The secondary winding 131 of another auxiliary transformer 133 is connected across the second resistor 129 in the control circuit of the auxiliary valve 119. The primary winding 135 of this auxiliary transformer 133 is connected across a resistor 137 in parallel with the primary winding 5 of the welding transformer 7. The purpose of the auxiliary transformer 133 is to supply a voltage in the control circuit of the auxiliary valve 119 sufficient to overcome the bias voltage of capacitor 109 and render the valve conductive.

Figure 2:
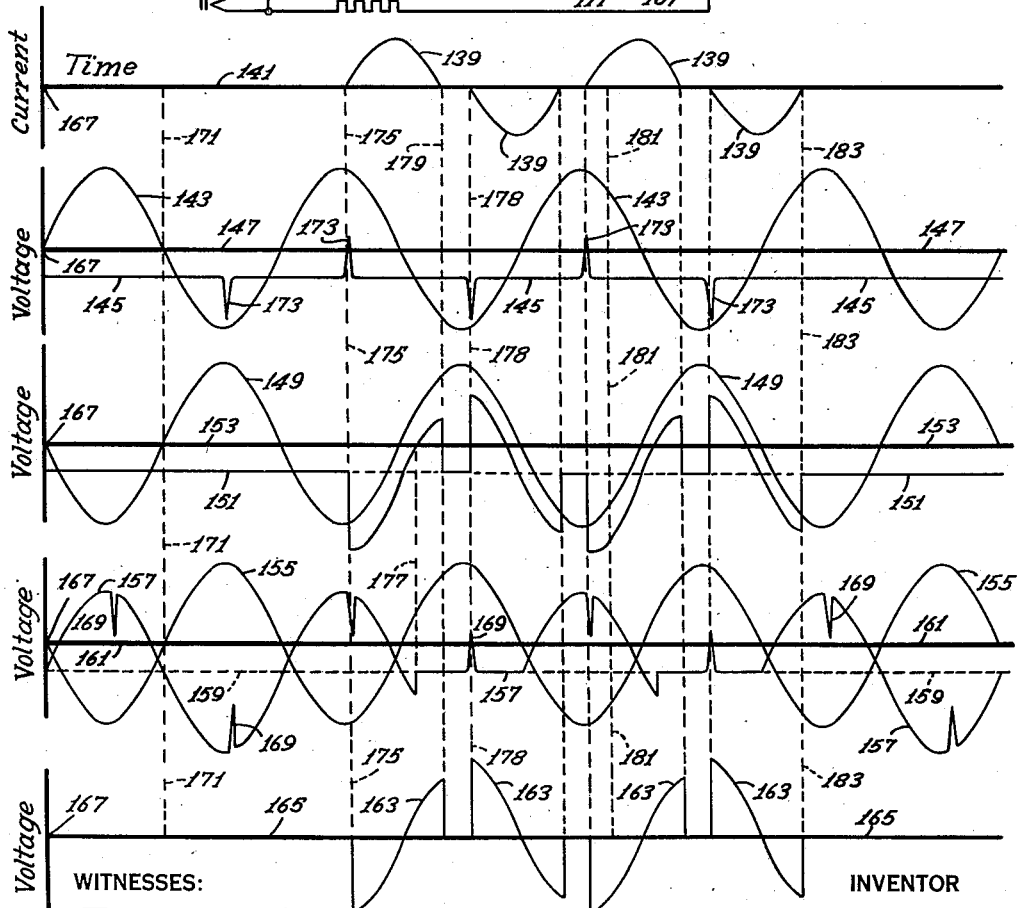
Fig. 2 is a series of curves illustrating the operations of the apparatus of Figure 1.

The operation of the system illustrated in Fig. 1 may be better understood by reference to the series of curves of Fig. 2. In Fig. 2, there is shown a series of curves representing either current or voltage plotted against time with identical time bases being employed with all of the curves. Curve 139 represents the current through the primary winding 5 of the welding transformer 7 with the portion above the base line 141 representing current through valve 17 and the portion below representing current through valve 19. Curve 143 represents the supply voltage with respect to the anode 39 of the first firing valve 37, while curve 145 represents the grid-to-cathode voltage of the first firing valve 37. For purposes of convenience, it is assumed that the base line 147 of curves 143 and 145 also represents the critical value of the grid-to-cathode voltage of the first firing valve 37 so that the valve is rendered conductive when the actual grid-to-cathode voltage becomes more positive than the critical value. Curve 149 represents the supply voltage with respect to the anode 121 of the auxiliary valve 119, while curve 151 represents the grid-to-cathode voltage of that valve. The base line 153 of curves 149 and 151 also represents the critical value of the grid-to-cathode voltage of the auxiliary valve. The supply voltage with respect to the anode 47 of the second firing valve 45 is represented by the curve 155 while the grid-to-cathode voltage is represented by curve 157, and the component of the grid-to-cathode voltage supplied by the biasing capacitor 109 is represented by dotted curve 159. The base line 161 of curves 155, 157 and 159 also represents the critical value of the grid-to-cathode voltage of the second firing valve. Curve 163 on base line 165 represents the secondary winding voltage of transformer 133 with respect to the grid 125 of auxiliary valve 119.

With the apparatus of Figure 1 in the condition illustrated, the voltage and current relations are as shown beginning at point 167 in Fig. 2. The supply voltages represented by curves 143, 149 and 155 are being impressed between the anodes and cathodes of the corresponding valves. The grid-to-cathode voltage curve 145 for the first firing valve 37 remains at a substantially constant, negative value determined by the voltage across the second resistor 57 in the valve's control circuit. The grid-to-cathode voltage curve 151 for the auxiliary valve 119 also remains at a substantially constant negative value determined by the voltage on the biasing capacitor 109 in the valve's control circuit. The grid-to-cathode voltage curve 157 for the second firing valve 45 is made up at this time of the substantially constant direct current biasing voltage of the capacitor 109 (curve 159) on which is superimposed an alternating voltage from the secondary winding 77 of the auxiliary transformer 67 and the voltage impulse across the third resistor 117 supplied through the phase-shifting circuit, which impulse results in peaks 169 on curve 157. It is to be noted that when the supply voltage curve 155 indicates the anode of the second firing valve is positive, the grid-to-cathode voltage curve 157 is maintained less positive than the critical value. Consequently, the second firing valve 45 is not rendered conductive.

Let it be assumed that the push-button switch 97 is closed at a time represented by the position of the vertical dotted line 171. Assuming the time delay relay 95 is energized, the relay 63 is then energized upon closure of the push-button switch. The contacts 61 or relay 63 open the short-circuit across the third resistor 59 in the control circuit of the first firing valve 37. As a result, voltage impulses across the resistor 59 are impressed in the control circuit causing peaks in the grid-to-cathode voltage curve as shown at 173. In the half-period of the supply voltage curve 143 in which the anode of the first firing valve 37 is positive, the voltage impulse across the third resistor is sufficient to overcome the biasing voltage of the second resistor, causing the grid-to-cathode voltage peaks at 173 to become more positive than the critical value curve 147. At that instant, represented by the dotted vertical line 175, the first firing valve 37 becomes conductive to render the first ignitron 17 conductive.

When the first ignitron 17 becomes conductive, current flows through the welding transformer 7 as illustrated by curve 139, lagging behind the supply voltage because of the inductance in the circuit. Current also flows through the resistor 137 in parallel with the primary winding 5 of the transformer 7 and the voltage developed thereacross is supplied through the auxiliary transformer 133 to the control circuit of the auxiliary valve 119. The voltage so impressed is shown by curve 163, and causes the grid-to-cathode voltage curve 151 for the auxiliary valve 119 to become more positive than the critical value curve 153 thereof at an instant represented by the dotted vertical line 177. Consequently, the auxiliary valve 119 is rendered conductive at that instant.

When the auxiliary valve 119 becomes conductive, the alternating-voltage component of the grid-to-cathode voltage curve 157 for the second firing valve 45 is substantially eliminated. Consequently, the next grid-to-cathode voltage peak 169 causes the grid-to-cathode voltage curve 157 to rise above the critical value curve 161 and the second firing valve 45 is rendered conductive to render the second ignitron 19 conductive at the instant represented by the dotted vertical line 178. This, of course, occurs in the half-period of the supply voltage immediately following the half-period in which the first ignitron 17 was rendered conductive.

Before the voltage impulse to render the second ignitron conductive occurs, the current through the welding transformer reaches zero, as at the time represented by dotted vertical line 179, and the first ignitron becomes nonconductive. The grid-to-cathode voltage curve 157 of the auxiliary valve then drops to the value of the biasing voltage supplied by the capacitor 109. However, the auxiliary valve 119 has already been rendered conductive and since the valve is of the arc-like type, the grid has lost control. Consequently, the auxiliary valve 119 continues to conduct until its anode-to-cathode voltage drops substantially to zero and the second firing valve 45, and, therefore, the second ignitron 19, is rendered conductive as previously described to supply current through the second ignitron to the welding transformer. Upon the current dropping substantially to zero, the second ignitron becomes nonconductive. If the push-button switch 97 remains closed, the first firing valve 37 is again rendered conductive at the instant of the voltage impulse from the phase-shifting circuit in each half-period in which the anode of the valve is positive. Each time the first ignitron conducts current, the auxiliary valve is rendered conductive so that the second firing valve and the second ignitron are, in turn, rendered conductive in the following half-period. Consequently, if the push-button switch be opened at some instant after the first ignitron is rendered conductive, represented by the dotted vertical line 181, current flows in the welding transformer until a time represented by the dotted vertical line 183.

As previously indicated, the instant at which the voltage impulses from the phase-shifting circuit occur is determined by the adjustment of the variable resistor 75 and the potentiometer 73. The potentiometer 73 is preferably calibrated in terms of per cent of heat to be developed, while the variable resistor 75 is calibrated in terms of power factor of the welding transformer supply circuit. Prior to operation of the system, the variable resistor 75 is adjusted so that the voltage impulse with a 100% heat setting on the potentiometer 73 occurs at the instant in a half-period at which the load current would pass through zero for the particular power factor involved. The potentiometer 73 is then adjusted at will to delay the voltage impulse even further by any desired amount to effect a supply of a desired average current.

It, therefore, becomes apparent that large transient currents are avoided even with a 100% heat setting of the potentiometer; the R. M. S. current supplied may be controlled at will by adjusting the potentiometer; and saturation of the welding transformer is avoided by the follow-up characteristic of the control system.

It is to be understood that while a system is illustrated as employing ignitrons in the supply circuit for the welding transformer which are rendered conductive by thyratrons, the ignitrons may be eliminated in some applications with the thyratrons no longer functioning as the firing valves but actually carrying the transformer supply current.

Figure 3:
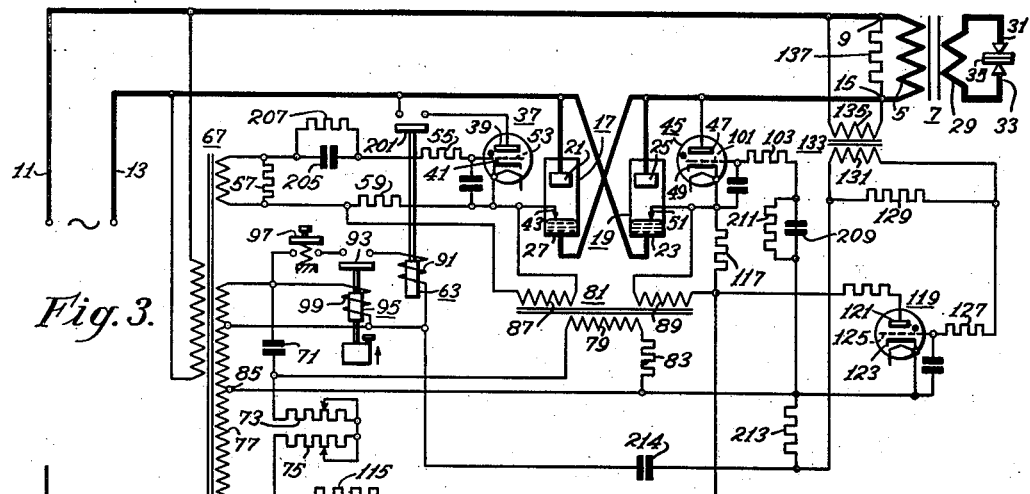
Fig. 3 is a modification of the apparatus shown in Figure 1.

The modified circuit shown in Fig. 3 is very similar to that shown in Figure 1, and the same reference characters have been applied to corresponding elements. The major difference in the circuit of Fig. 3 from that of Figure 1 is that the latter has a self-biasing arrangement for the first and second firing valves 37 and 45. To permit operation of this self-biasing arrangement, the relay 63, which is energized by the push-button switch 97, has normally open contacts 201 in the anode circuit of the first firing valve, and the contacts 61 short-circuiting the third resistor 59 in the control circuit of the first firing valve of Figure 1 is eliminated in Fig. 3.

The control circuit of the first firing valve 37 in Fig. 3 may be traced from the grid 53 thereof through the grid resistor 55, a capacitor 205 shunted by a resistor 207 and the second and third resistors 57 and 59 to the cathode 41. The third resistor 59 has impressed thereacross voltage impulses as described in connection with Figure 1. The second resistor 57 has a voltage developed thereacross by current supplied from the auxiliary transformer 67, but the rectifier in the supply circuit of Figure 1 is not included in Fig. 3 so that in the latter circuit the voltage across the second resistor 57 is alternating. During the half-periods of alternating voltage across the second resistor 57 in which the grid 53 is positive, current will flow from the resistor 57 through the capacitor 205, grid resistor 55, grid 53 and cathode 41 and third resistor 59. The rectifying action of the grid-cathode circuit prevents the flow of current in the opposite direction. During the flow of current in the grid-cathode circuit, the capacitor 205 is charged in a direction tending to make the grid 53 negative with respect to the cathode 41. In the following half-period, the capacitor 205 discharges gradually through the resistor 207 in shunt therewith. The voltage appearing across the capacitor 205 makes it certain that the first valve is not rendered conductive except by the voltage impulse on the resistor 59.

The control circuit of the second firing valve 45 may be traced from the grid 101 thereof through a grid resistor 103, a capacitor 209 shunted by a resistor 211 to the intermediate tap 85 of the secondary winding 77 of the auxiliary transformer 67, and from the lower end of the secondary winding 77 through the second resistor 115 and the third resistor 117 to the cathode 49. Since the alternating-voltage component supplied through the secondary winding 77 in the control circuit of the second firing valve 45 causes the grid 101 to become positive with respect to the cathode 49 during the half-periods of the supply voltage in which the anode 47 of the second firing valve 45 is negative, the capacitor 209 in the control circuit is charged by current flow in the grid-cathode circuit similarly to the charging of the capacitor 205 at the control circuit of the first firing valve 37. The voltage on capacitor 209 serves the same function in the Fig. 3 circuit as the voltage across the capacitor 109 in Figure 1.

The control circuit of the auxiliary valve 119 in Fig. 3 extends from the grid 125 thereof through the grid resistor 127, the second resistor 129 energized from the second auxiliary transformer 133 and a third resistor 213 to the cathode 123. The third resistor 213 is connected in series with another capacitor 214, the energizing coil 91 of the relay 63, the contacts 93 of the time delay relay 95 and the push-button switch 97 across a portion of the secondary winding 77 of the auxiliary transformer 67. Consequently, an alternating voltage appears across the third resistor 213 which is a little more than 180° out of phase with the anode-to-cathode potential.

Figure 4:
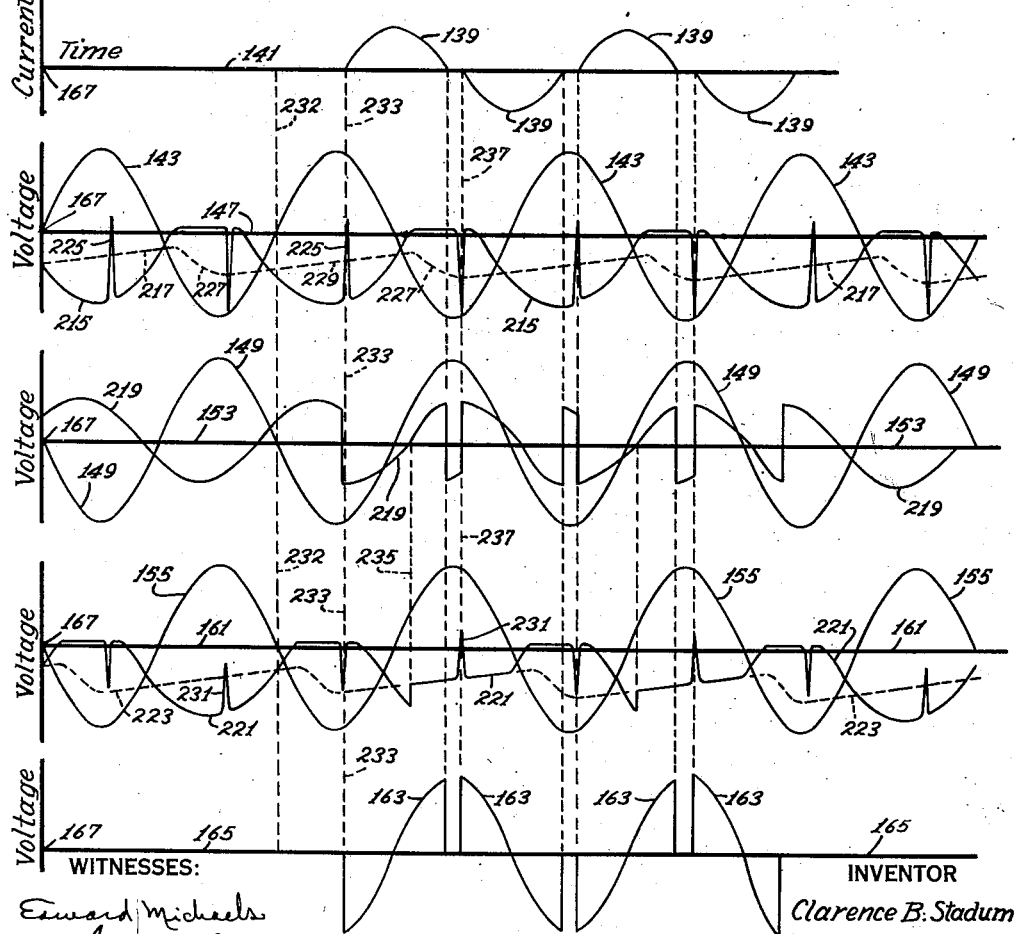
Fig. 4 is a series of curves illustrating the operation of the apparatus of Fig. 3.

The operation of the circuit of Fig. 3 may be better understood from the curves shown in Fig. 4, many of which are similar to curves of Fig. 2 and bear the same reference characters. In Fig. 4, however, the grid-to-cathode voltage of the first firing valve 37 is represented by curve 215 with the component thereof appearing across capacitor 205 being shown by curve 217. The grid-to-cathode voltage of the auxiliary valve 119 is illustrated by curve 219. Curve 221 represents the grid-to-cathode voltage of the second firing valve with the component thereof appearing across capacitor 209 being shown as curve 223.

The grid-to-cathode voltage of the first firing valve 37 as shown in curve 215 is made up of the voltage across the capacitor 205 upon which is superimposed the alternating voltage across the resistor 57 and the voltage impulses across the third resistor 59 which appears as peaks 225 on curve 215. It will be noted that the grid-to-cathode voltage curve 215 remains substantially constant in the portion thereof in which the grid is positive as the grid-cathode current is then flowing. During this time the capacitor 205 is charged as shown along portion 227 of the dotted curve 217, and when the grid becomes negative, the capacitor 205 is discharged along portion 229 as shown. While the grid-to-cathode voltage becomes positive at the instant of the voltage peaks 225, the first firing valve is not rendered conductive originally because its anode circuit is open at contacts 201.

The grid-to-cathode voltage of the second firing valve 45 as shown in curve 221 is made up of the voltage across the capacitor 209 plus the alternating voltage supplied from the secondary winding 77 and the voltage impulses across the resistor 117 which appear as peaks 231 on curve 221.

Let it be assumed that the push-button switch is closed at the time represented by the dotted vertical line 232. The relay 63 is then energized completing the anode circuit of the first firing valve 37. The first firing valve 37 is then rendered conductive at the instant of the next voltage peak 225 in the half-period in which the anode of the valve is positive as represented by the vertical dotted line 233. The first ignitron 17 is accordingly rendered conductive and welding current flows as illustrated in curve 139. The voltage impressed in the control circuit of the auxiliary valve 119 by the second auxiliary transformer 133 as a result of the current flow through the first ignitron is shown in curve 163 and causes the grid-to-cathode voltage curve 219 to become positive at a time represented by the vertical dotted line 235, to render the auxiliary valve 119 conductive. When the auxiliary valve 119 becomes conductive, the alternating-voltage component of the grid-to-cathode voltage of the second firing valve 45 is substantially eliminated so that the second firing valve 45 will be rendered conductive by the next voltage peak 231 at a time represented by the dotted vertical line 237. Before the second firing valve 45 becomes conductive to render the second ignitron 19 conductive, the first ignitron 17 becomes nonconductive at a time represented by the dotted vertical line 239 and in the manner described in connection with Fig. 2.

So long as the push-button switch 97 remains closed, the first firing valve 37 and the first ignitron 17 continue to be rendered conductive in alternating half-periods and the second firing valve 45 and second ignitron 19 are always rendered conductive in a half-period following the half-period in which the first ignitron 17 is conductive.

While I have shown and described specific embodiments of my invention, I am aware that many modifications thereof are possible without departing from the spirit of the invention. It, accordingly, is not my intention to limit my invention to the specific embodiments shown and described.

I claim as my invention:

For use in supplying current through a load from a pair of alternating voltage supply lines, the combination comprising a pair of inversely connected valves of the arc-like type interposed in circuit with said load across said lines, a first control circuit having output connections to the first of said valves for rendering the first of said valves conductive in a half-period of the supply voltage of one polarity, a second control circuit having output connections connected to the second valve to control its conductivity, the net potential of said second control circuit across said last-named output connections, relative to an electrical reference point, being normally more negative than a predetermined critical magnitude which said net potential must exceed algebraically to render said second valve conductive, a capacitor, an auxiliary transformer energized from said lines and having a secondary winding with one end connected to one side of the capacitor, a rectifier connected to conduct current from the other side of the capacitor to an intermediate point on said secondary winding whereby the capacitor is charged, a peaking transformer energized from said lines and having a secondary winding, said second control circuit including the capacitor and the secondary windings of said transformers, said secondary winding of said peaking transformer being effective to impress across said output connections of said second control circuit at a predetermined instant during each half-period of opposite polarity, impulses of short duration compared to the half-periods of the voltage derived from said lines which are positive relative to said reference point, and said capacitor and said transformer being so connected to said last-named output connections that they impress across said last-named output connections during each said half-period of opposite polarity, potentials which are negative relative to said reference point the resultant voltage so impressed being less positive than said critical magnitude, an auxiliary valve of the arc-like type having an anode and cathode connected in a shunt circuit across a part of the secondary winding of the auxiliary transformer and having a control electrode, and circuit means connecting said electrode to the plate of said capacitor which is electrically negative relative to said point whereby the auxiliary valve is normally non-conductive, said last-named circuit means including means responsive to load current in a half-period of said one polarity to render the auxiliary valve conductive in the next succeeding half-period of opposite polarity reducing the absolute magnitude of the negative voltage (relative to said reference point) impressed across said last-named output connections to a magnitude such that the net voltage across said last-named output connections is above the critical magnitude during said voltage impulses of short duration.

CLARENCE B. STADUM.

REFERENCES CITED

The following references are of record in the file of this patent:

UNITED STATES PATENTS

| Number | Name | Date |
|---|---|---|
| 1,970,515 | Lord | Aug. 14, 1934 |
| 2,126,398 | Knowles | Aug. 9, 1938 |
| 2,169,023 | Dawson | Aug. 8, 1939 |
| 2,270,799 | Gulliksen | Jan. 20, 1942 |
| 2,283,719 | Bivens | May 19, 1942 |
| 2,331,124 | Livingston | Oct. 5, 1943 |